United States Patent
Wang et al.

(10) Patent No.: US 12,327,687 B1
(45) Date of Patent: Jun. 10, 2025

(54) CAPACITOR MANUFACTURING PROCESS CAPABLE OF CONTROLLING CAPACITOR RESISTANCE AND WITHOUT WELDING TIN-COPPER CONDUCTIVE SHEET

(71) Applicant: SUZHOU JOSUN PRECISION STAMPING CO., LTD., Suzhou (CN)

(72) Inventors: Fan Wang, Suzhou (CN); Chengxiang Wang, Suzhou (CN)

(73) Assignee: SUZHOU JOSUN PRECISION STAMPING CO., LTD., Suzhou (CN)

( * ) Notice: Subject to any disclaimer, the term of this patent is extended or adjusted under 35 U.S.C. 154(b) by 0 days.

(21) Appl. No.: 19/055,737

(22) Filed: Feb. 18, 2025

Related U.S. Application Data

(63) Continuation of application No. PCT/CN2023/096152, filed on May 25, 2023.

(30) Foreign Application Priority Data

Aug. 23, 2022 (CN) .......................... 202211009199.5

(51) Int. Cl.
*H01G 4/18* (2006.01)
*H01G 4/008* (2006.01)

(52) U.S. Cl.
CPC ............... *H01G 4/18* (2013.01); *H01G 4/008* (2013.01)

(58) Field of Classification Search
CPC ................................. H01G 4/008; H01G 4/18
See application file for complete search history.

(56) References Cited

FOREIGN PATENT DOCUMENTS

| | | |
|---|---|---|
| CN | 207705134 U | 8/2018 |
| GB | 1266729 A | 3/1972 |
| WO | WO2016011913 A1 | 1/2016 |

*Primary Examiner* — Nathan Milakovich
(74) *Attorney, Agent, or Firm* — Nitin Kaushik

(57) ABSTRACT

The present invention discloses a capacitor manufacturing process capable of controlling capacitor resistance and without welding a tin-copper conductive sheet. The manufacturing process includes the following working steps: (1) electroplating, involving: electroplating a capacitor base layer, for being compatible with different metal materials; (2) vacuum plating, involving: vacuum plating a metal layer, for being compatible with different metal materials and non-metal materials; and (3) electroplating, involving: electroplating a metal outer layer, for reducing a capacitor resistance value and further controlling the capacitor resistance to be less than 3 milliohms. The beneficial effects of the present invention lie in that: by adopting a process, different metal materials and non-metal materials can be directly combined at the same time, and a capacitor can be directly welded onto a circuit board so as to meet the use requirements.

6 Claims, No Drawings

CAPACITOR MANUFACTURING PROCESS CAPABLE OF CONTROLLING CAPACITOR RESISTANCE AND WITHOUT WELDING TIN-COPPER CONDUCTIVE SHEET

CROSS-REFERENCE TO RELATED APPLICATIONS

The application claims priority to Chinese patent application No. 202211009199.5, filed on Aug. 23, 2022, the entire contents of which are incorporated herein by reference.

TECHNICAL FIELD

The present invention relates to the technical field of capacitor processing, and in particular, to a capacitor manufacturing process capable of controlling capacitor resistance and without welding a tin-copper conductive sheet.

BACKGROUND

Since a capacitor is composed of three materials, namely aluminum, copper, and plastic, which are processed in three different processes, combining these three materials to achieve the intended use needs to overcome a variety of difficulties. In addition, to control the capacitor resistance to be less than 3 milliohms, it is necessary to weld tin-copper conductive sheets onto the capacitor to meet the requirement. However, when used in different scenarios, existing capacitor processing methods can no longer meet the use requirements. There is an increasing demand for thinner thickness of the capacitor, and current capacitor processing has specific requirements for the thickness of the capacitor. If the thickness is too small, the capacitor cannot be processed and used by using existing processes.

In view of the above, it is necessary to improve existing capacitor preparation methods to adapt to the current needs for capacitor usage.

SUMMARY

A purpose of the present invention is to solve the above problems by designing a capacitor manufacturing process capable of controlling capacitor resistance and without welding a tin-copper conductive sheet.

A technical solution for achieving the above purpose of the present invention is as follows: a capacitor manufacturing process capable of controlling capacitor resistance and without welding a tin-copper conductive sheet, including the following working steps:

(1) electroplating, involving: electroplating a capacitor base layer, for being compatible with different metal materials;

(2) vacuum plating, involving: vacuum plating a metal layer, for being compatible with different metal materials and non-metal materials; and (3) electroplating, involving: electroplating a metal outer layer, for reducing a capacitor resistance value and further controlling the capacitor resistance to be less than 3 milliohms, where the capacitor resistance is surface contact resistance of a capacitor.

As a further supplement to this technical solution, the step (1) electroplating a capacitor base layer includes the following working steps:

1) washing and degreasing, involving: removing oil stains generated during a manufacturing procedure on a surface of a product by using ultrasonic waves and a degreasing agent;

2) washing, involving: washing with pure water at room temperature, for removing a residual degreasing agent on the surface of the product, where the washing refers to flipping the product in the pure water to clean the surface of the product;

3) zinc deposition, involving: soaking in a zinc solution for zinc deposition to facilitate subsequent electroplating;

4) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature and to flipping the product in the pure water to clean the surface of the product;

5) electroless nickel plating, where an electroless nickel solution for the electroless nickel plating includes 25 g/L-28 g/L nickel sulfate, 23 g/L-28 g/L sodium hypophosphite, and a remaining amount of ionized water;

6) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature and to flipping the product in the pure water to clean the surface of the product;

7) gold plating, involving: performing electroplating in a gold solution at 35-75° C. for 5-10 min or using chemical plating.

As a further supplement to this technical solution, the step (2) vacuum plating a metal layer includes the following working steps:

8) washing and drying, involving: washing a residual electroplating solution on the surface of the product with pure water, where the washing refers to flipping the product in the pure water to clean the surface of the product; and drying the product with hot air to remove residual moisture on the surface of the product;

9) vacuum electroplating a metal layer, where production starts in a state when a furnace temperature of a vacuum furnace is 150-280° C. and a vacuum degree is controlled to be $3.0 \times 10^{-3}$ Pa, and an operating time is 30-60 min;

10) cooling and discharging, involving: after the furnace temperature drops to below 100° C., releasing air to make vacuum pressure return to a normal atmospheric pressure state to open the furnace; and 11) inspection, involving: checking whether different metal materials and non-metal materials in the product are compatible by using inspection equipment.

As a further supplement to this technical solution, the step (3) electroplating a metal outer layer includes the following steps:

12) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature and to flipping the product in the pure water to clean the surface of the product;

13) copper plating, involving: electroplating the product in a copper solution at 35-75° C. for 40-90 min or using chemical plating;

14) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature and to flipping the product in the pure water to clean the surface of the product;

15) Ni plating, involving: performing electroplating in a nickel solution at 35-75° C. for 15-30 min or using chemical plating;

16) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature and to flipping the product in the pure water to clean the surface of the product;

17) Ag plating or Au plating, where the Ag plating refers to performing electroplating in a silver solution at 35-75° C. for 5-10 min or using chemical plating; and the Au plating refers to performing electroplating in a gold solution at 30-60° C. for 5-10 min or using chemical plating;

18) washing and drying, involving: washing a residual electroplating solution on the surface of the product with pure water, where the washing refers to flipping the product in the pure water to clean the surface of the product; and drying the product with hot air to remove residual moisture on the surface of the product; and 19) inspection, involving: inspecting whether resistance of the product is less than 3 milliohms by using inspection equipment; where the sulfuric acid pure water solution containing 5%-10% of sulfuric acid in step 4), step 6), step 12), step 14), and step 16) represents that the sulfuric acid pure water solution contains 5%-10% of sulfuric acid by volume.

As a further supplement to this technical solution, the activation in step (1), step (2), and step (3) refers to performing activation in an activation solution at room temperature.

As a further supplement to this technical solution, a temperature of a solution within the ultrasonic waves in step (1) is 50-80° C., and the time is 15 min.

As a further supplement to this technical solution, a cleaning time in step (1), step (2), and step (3) is 1-2 min.

As a further supplement to this technical solution, vacuum electroplated metal in step (2) is any one of Ag, Au, Cu.

A capacitor, manufactured by adopting any one of the manufacturing processes described above.

The beneficial effects of the present invention lie in that: by adopting a novel process, different metal materials and non-metal materials can be directly combined at the same time, and the capacitor can be directly welded onto a circuit board so as to meet the use requirements, and meanwhile, the capacitor resistance can be controlled to be less than 3 milliohms, where electroplating the metal outer layer can be used for reducing capacitor resistivity, and at the same time, the capacitor can be directly welded onto the circuit board without welding an external tin-copper conductive sheet; the advantages of good use effect, convenient processing, and high stability are achieved; and compared to traditional processes, the process flow is simplified, the complexity of the process is reduced, and the process of the present invention can achieve mass production for the development of capacitor miniaturization.

DETAILED DESCRIPTION OF THE EMBODIMENTS

This technical solution is proposed since existing capacitor processing methods cannot meet the use requirements of users gradually, have tighter control of thickness, and are poor in processing effect and use effect in the case of smaller thickness. Therefore, a novel capacitor and manufacturing process are designed based on defects of the prior art, which can combine copper, aluminum, and plastic together by adopting a processing process.

In order to facilitate greater clarity of this technical solution for those skilled in the art, the technical solution of the present invention will be described in detail below:

a capacitor manufacturing process capable of controlling capacitor resistance and without welding a tin-copper conductive sheet, including the following working steps:

(1) electroplating, involving: electroplating a capacitor base layer, for being compatible with different metal materials (such as copper, aluminum, and other different metal materials);

(2) vacuum plating, involving: vacuum plating a metal layer, for being compatible with different metal materials and non-metal materials (such as engineering plastics, ceramics, etc.); and (3) electroplating, involving: electroplating a metal outer layer, for reducing a capacitor resistance value and further controlling the capacitor resistance to be less than 3 milliohms, where at the same time, a capacitor can be directly welded onto the circuit board without welding an external conductive sheet, and the capacitor resistance is surface contact resistance of the capacitor.

Through the above process, the following effects are achieved: 1. after plating, the capacitor resistance value can be reduced without welding traditional external conductive sheets; 2. after plating, the capacitor can be directly soldered onto the circuit board; 3. compared to the traditional processes, the process flow is simplified, and the complexity of the process is reduced; and 4. due to the development of capacitor miniaturization, the process of the present invention can achieve mass production for subsequent micro capacitors (with thickness reduced to half or more of a current capacitor).

In detail, the step (1) electroplating a capacitor base layer, for being compatible with different metal materials includes the following working steps:

1) washing and degreasing, involving: removing oil stains generated during a manufacturing procedure on a surface of a product by using ultrasonic waves and a degreasing agent, where a temperature of a solution within the ultrasonic waves is 50-80° C., and the working time is 15 min;

2) washing, involving: washing with pure water at room temperature, for removing a residual degreasing agent on the surface of the product, where a washing time is 1-2 min, and the washing refers to flipping the product in the pure water to clean the surface of the product;

3) zinc deposition, where a purpose of this setup is that since aluminum parts cannot be directly electroplated, the aluminum parts need to be soaked in a zinc solution for zinc deposition to facilitate subsequent electroplating;

4) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature for 1-2 min and to flipping the product in the pure water to clean the surface of the product;

5) electroless nickel plating, where an electroless nickel solution for the electroless nickel plating includes 25 g/L-28 g/L nickel sulfate, 23 g/L-28 g/L sodium hypophosphite, and a remaining amount of ionized water;

6) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature for 1-2 min and to flipping the product in the pure water to clean the surface of the product;

7) gold plating, involving: performing electroplating in a gold solution at 35-75° C. for 5-10 min or using chemical plating.

In detail, the step (2) vacuum plating a metal layer includes the following working steps:

8) washing and drying, involving: washing a residual electroplating solution on the surface of the product with pure water, and flipping the product in the pure water to clean the surface of the product; and drying the product with hot air to remove residual moisture on the surface of the product, where the washing time is 1-2 min;

9) vacuum electroplating metal, where the metal is preferably any one of Ag, Au, Cu, production starts in a state when a furnace temperature of a vacuum furnace is 150-280° C. and a vacuum degree is controlled to be $3.0 \times 10^{-3}$ Pa, and an operating time is 30-60 min;

In this step, the operation of vacuum electroplating a metal layer is to perform processing based on the operation of electroplating a capacitor base layer, where a material for vacuum electroplating a metal layer is a material obtained after electroplating a capacitor base layer. Since aluminum materials cannot be directly electroplated, it must undergo zinc deposition prior to subsequent electroplating; therefore, a zinc deposition operation is required before electroplating. A metal target material is deposited onto a non-metal material via a vacuum electroplating process, and implementation conditions for vacuum electroplating are as follows: the vacuum electroplating process requires that an inert gas (argon gas) is charged in a vacuum state where a vacuum degree is $3.0 \times 10^{-3}$ Pa, and high-voltage direct current is applied between metal and non-metal substrates (an anode) and the metal target material (a cathode). As electrons generated by glow discharge excite the inert gas, a plasma is generated to bombard atoms of the metal target material, enabling the atoms to be deposited on the metal or non-metal substrate, i.e., completing the operation of vacuum electroplating a metal layer;

10) cooling and discharging, involving: after the furnace temperature drops to below 100° C., releasing air to make vacuum pressure return to a normal atmospheric pressure state to open the furnace; and 11) inspection, involving: checking whether different metal materials and non-metal materials in the product are compatible by using inspection equipment.

Further, the step (3) electroplating a metal outer layer for reducing a capacitor resistance value and further controlling the capacitor resistance to be less than 3 milliohms includes the following steps:

12) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature for 1-2 min and to flipping the product in the pure water to clean the surface of the product;

13) copper plating, involving: electroplating the product in a copper solution at 35-75° C. for 40-90 min or using chemical plating;

14) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature for 1-2 min and to flipping the product in the pure water to clean the surface of the product;

15) Ni plating, involving: performing electroplating in a nickel solution at 35-75° C. for 15-30 min or using chemical plating;

16) washing and activation, involving: activating the product by using a sulfuric acid pure water solution containing 5%-10% of sulfuric acid, allowing a metal surface layer of the product to maintain an active state for electroplating, where the washing refers to performing washing in pure water at room temperature for 1-2 min and to flipping the product in the pure water to clean the surface of the product;

17) Ag plating or Au plating, where the Ag plating refers to performing electroplating in a silver solution at 35-75° C. for 5-10 min or using chemical plating; and the Au plating refers to performing electroplating in a gold solution at 30-60° C. for 5-10 min or using chemical plating;

18) washing and drying, involving: washing a residual electroplating solution on the surface of the product with pure water, and drying the product with hot air to remove residual moisture on the surface of the product, where a washing time is 1-2 min, and the washing refers to flipping the product in the pure water to clean the surface of the product;

19) inspection, involving: inspecting whether resistance of the product is less than 3 milliohms by using inspection equipment; where the sulfuric acid pure water solution containing 5%-10% of sulfuric acid in step 4), step 6), step 12), step 14), and step 16) represents that the sulfuric acid pure water solution contains 5%-10% of sulfuric acid by volume; and meanwhile, the "zinc solution", "copper solution", "nickel solution", and "gold solution" mentioned in this technical solution are all commercially available materials.

As a further limitation to this technical solution, the activation in step (1), step (2), and step (3) refers to performing activation in an activation solution at room temperature.

A capacitor, where the capacitor is manufactured by adopting the above-mentioned manufacturing process and is directly soldered onto a circuit board after being manufactured.

The above technical solutions only embody the preferred technical solutions of the present invention, and some changes that may be made to some parts thereof by those skilled in the art embody the principles of the present invention and fall within the scope of protection of the present invention.

What is claimed is:

1. A capacitor manufacturing process capable of controlling capacitor resistance and without welding a tin-copper conductive sheet, comprising the following working steps:
   (1) electroplating, involving: electroplating a capacitor base layer, for being compatible with different metal materials;
   (2) vacuum plating, involving: vacuum plating a metal layer, for being compatible with different metal materials and non-metal materials; and
   (3) electroplating, involving: electroplating a metal outer layer, for reducing a capacitor resistance value and further controlling the capacitor resistance to be less than 3 milliohms; wherein
   the step (1) electroplating a capacitor base layer comprises the following working steps:
   1) washing and degreasing, involving: removing oil stains generated during a manufacturing procedure on a surface of a product by using ultrasonic waves and a degreasing agent;
   2) washing, involving: washing with pure water at room temperature, for removing a residual degreasing agent on the surface of the product;
   3) zinc deposition, involving: soaking in a zinc solution for zinc deposition to facilitate subsequent electroplating;
   4) washing and activation, involving: activating the product by using a sulfuric acid pure water solution containing 5%-10% of sulfuric acid, allowing a metal surface layer of the product to maintain an active state for electroplating, wherein the washing refers to performing washing in pure water at room temperature, and the washing refers to flipping the product in the pure water to clean the surface of the product;
   5) electroless nickel plating, wherein an electroless nickel solution for the electroless nickel plating comprises 25 g/L-28 g/L nickel sulfate, 23 g/L-28 g/L sodium hypophosphite, and a remaining amount of ionized water;
   6) washing and activation, involving: activating the product by using a sulfuric acid pure water solution containing 5%-10% of sulfuric acid, allowing a metal surface layer of the product to maintain an active state for electroplating, wherein the washing refers to performing washing in pure water at room temperature, and the washing refers to flipping the product in the pure water to clean the surface of the product; and
   7) gold plating, involving: performing electroplating in a gold solution at 35-75° C. for 5-10 min or using chemical plating;
   the step (2) vacuum plating a metal layer comprises the following working steps:
   8) washing and drying, involving: washing a residual electroplating solution on the surface of the product with pure water, wherein the washing refers to flipping the product in the pure water to clean the surface of the product; and drying the product with hot air to remove residual moisture on the surface of the product;
   9) vacuum electroplating a metal layer, wherein production starts in a state when a furnace temperature of a vacuum furnace is 150-280° C. and a vacuum degree is controlled to be $3.0 \times 10^{-3}$ Pa, and an operating time is 30-60 min;
   10) cooling and discharging, involving: after the furnace temperature drops to below 100° C., releasing air to make vacuum pressure return to a normal atmospheric pressure state to open the furnace; and
   11) inspection, involving: checking whether different metal materials and non-metal materials in the product are compatible by using inspection equipment; wherein the step (3) electroplating a metal outer layer comprises the following steps:
   12) washing and activation, involving: activating the product by using a sulfuric acid pure water solution containing 5%-10% of sulfuric acid, allowing a metal surface layer of the product to maintain an active state for electroplating, wherein the washing refers to performing washing in pure water at room temperature and to flipping the product in the pure water to clean the surface of the product;
   13) copper plating, involving: electroplating the product in a copper solution at 35-75° C. for 40-90 min or using chemical plating;
   14) washing and activation, involving: activating the product by using a sulfuric acid pure water solution containing 5%-10% of sulfuric acid, allowing a metal surface layer of the product to maintain an active state for electroplating, wherein the washing refers to performing washing in pure water at room temperature and to flipping the product in the pure water to clean the surface of the product;
   15) Ni plating, involving: performing electroplating in a nickel solution at 35-75° C. for 15-30 min;
   16) washing and activation, involving: activating the product by using a sulfuric acid pure water solution containing 5%-10% of sulfuric acid, allowing a metal surface layer of the product to maintain an active state for electroplating, wherein the washing refers to performing washing in pure water at room temperature and to flipping the product in the pure water to clean the surface of the product;
   17) Ag plating or Au plating, wherein the Ag plating refers to performing electroplating in a silver solution at 35-75° C. for 5-10 min or using chemical plating; and the Au plating refers to performing electroplating in a gold solution at 30-60° C. for 5-10 min or using chemical plating;
   18) washing and drying, involving: washing a residual electroplating solution on the surface of the product with pure water, wherein the washing refers to flipping the product in the pure water to clean the surface of the product; and drying the product with hot air to remove residual moisture on the surface of the product; and
   19) inspection, involving: inspecting whether resistance of the product is less than 3 milliohms by using inspection equipment.

2. The capacitor manufacturing process capable of controlling capacitor resistance and without welding a tin-copper conductive sheet according to claim 1, wherein the activation in step (1) and step (3) refers to performing activation in an activation solution at room temperature.

3. The capacitor manufacturing process capable of controlling capacitor resistance and without welding a tin-copper conductive sheet according to claim 2, wherein a temperature of a solution within the ultrasonic waves in step (1) is 50-80° C., and the time is 15 min.

4. The capacitor manufacturing process capable of controlling capacitor resistance and without welding a tin-copper conductive sheet according to claim 3, wherein a cleaning time in step (1), step (2), and step (3) is 1-2 min.

5. The capacitor manufacturing process capable of controlling capacitor resistance and without welding a tin-copper conductive sheet according to claim 4, wherein vacuum electroplated metal in step (2) is any one of Ag, Au, Cu.

6. A capacitor, wherein the capacitor is manufactured by adopting the manufacturing process according to claim 1.

* * * * *